United States Patent Office 3,213,493
Patented Oct. 26, 1965

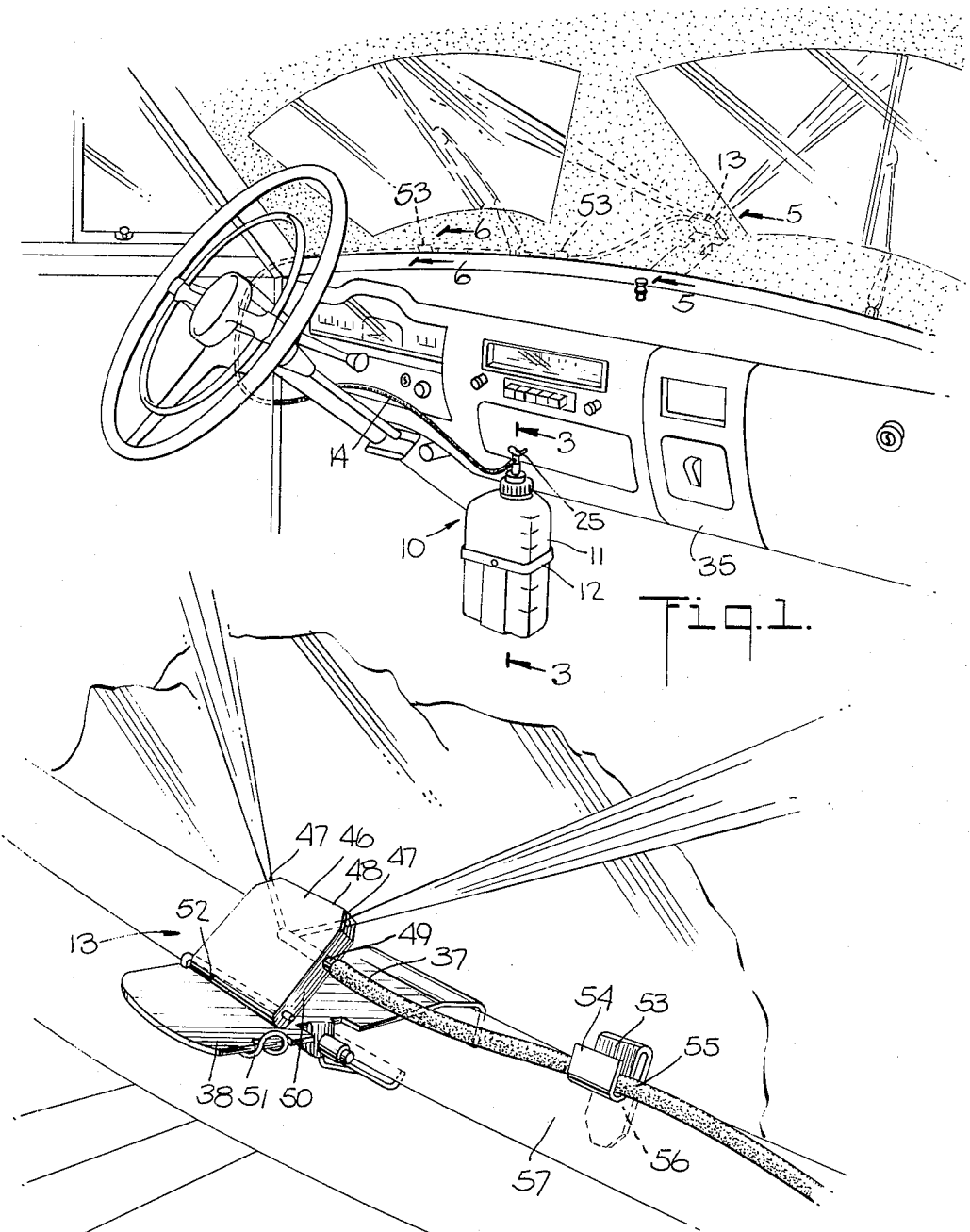

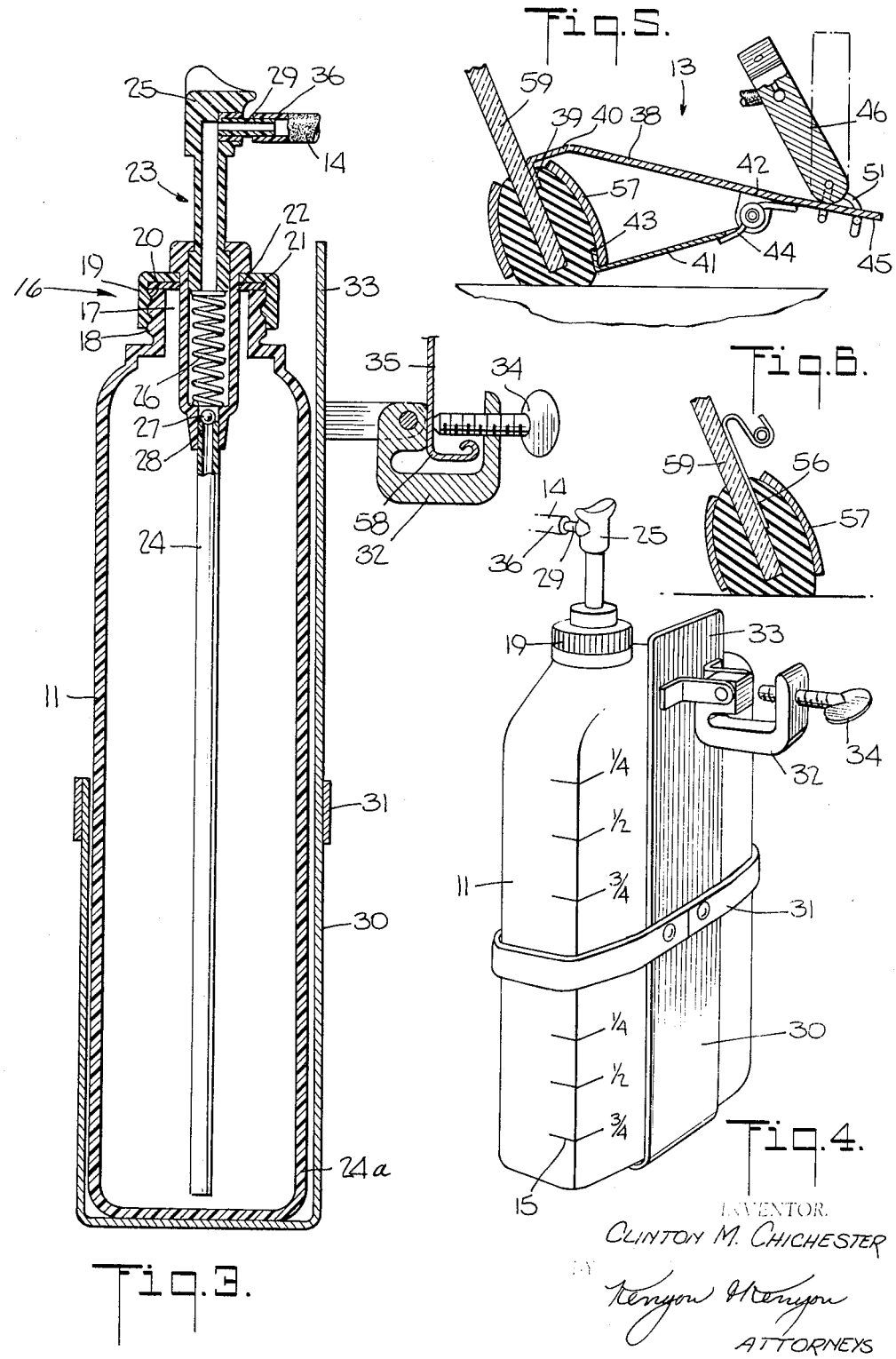

3,213,493
WINDSHIELD CLEANING APPARATUS
Clinton M. Chichester, 31 Apple St., Wallingford, Conn.
Filed Feb. 28, 1964, Ser. No. 348,107
1 Claim. (Cl. 20—40.5)

This application is a continuation-in-part of my earlier application Ser. No. 67,343, filed November 4, 1960, and now abandoned.

This invention relates to a novel, inexpensive windshield cleaning apparatus. It also relates to windshield cleaning apparatus which may be quickly installed or removed and which may be used in emergencies.

It is an object of this invention, therefore, to provide a windshield cleaning device which may be installed or removed quickly from the wing window, or some other suitable location on an automobile, and which will distribute a cleaning liquid evenly to the windshield thereof.

It is a further object of this invention to provide a simple, inexpensive windshield cleaning device.

These and further objects of the present invention will appear from the following description which is to be read in conjunction with the accompanying drawings wherein like components in the several views are identified by the same reference numerals.

In the drawings:

FIG. 1 is a perspective view of the apparatus of the present invention as assembled in an automobile;

FIG. 2 is an enlarged perspective view of the nozzle means as attached to the windshield;

FIG. 3 is an enlarged vertical section of the reservoir and pumping means;

FIG. 4 is a perspective view of the reservoir and bracket assembly;

FIG. 5 is an enlarged vertical section of the nozzle means as attached to the windshield trim; and FIG. 6 is an enlarged vertical section of the clip means as assembled on the windshield trim.

Referring now to the drawings, particularly FIGS. 1, 3 and 4, the apparatus of the present invention is designated generally by reference numeral 10 and includes a reservoir 11 held in a bracket support 12, a nozzle means 13 and an inter-connecting flexible tube 14. The reservoir 11 is a fluid tight container or bottle fabricated of any suitable material such as polyethylene or other plastic and may have volume indicia 15 along the side thereof (see FIG. 4). The top 16 of the bottle is provided with an opening 17 having suitable screw threads 18 on the outer surface thereof on which is mounted a cap 19 having corresponding internal threads 20 by which it is releasably secured to the bottle 11. Suitable gasket means 21 is included between the cap 19 and the top 16. Cap 19 is provided with a central aperture or hole 22. Mounted on cap 19 is tube and pumping means 23 which extends through hole 22 in cap 19 and includes vertical tube 24 which extends to the bottom portion 24a of reservoir 11. Extending upwardly from the cap 19 is a manually operable plunger member 25 biased outwardly from reservoir 11 by spring member 26 and cooperating with ball check valve 27 at the upper end 28 of vertical tube 24 to function as pumping means for selectively delivering fluid from the interior of reservoir 11 through discharge tube 29 on plunger member 25.

Bracket 12 is comprised of a vertical U-shaped plate 30 and horizontal strap 31 secured thereto at an intermediate portion thereof to provide a mounting receptacle for bottle 11 and includes mounting lug or clamp 32 pivotally affixed to the upper portion 33 of U-shaped member 30 having an adjustable mounting screw or bolt 34 associated therewith for clamping the bracket assembly 12 to an automobile instrument panel 35 or the like.

Flexible tube 14 has its inner end 36 attached to the discharge tube 29 on the pumping means 23 and is attached at its outer end 37 to nozzle means 13 which includes bracket member 38 having an inwardly turned portion 39 at one end 40 thereof and a clamping member 41 pivotally mounted to said bracket 38 at an intermediate portion 42 and having a corresponding inwardly turned end portion 43 thereon cooperating with the other inwardly turned portion 39 to provide attaching or clamping jaws biased toward one another by spring means 44 (see FIG. 5).

Pivotally mounted on or near the end portion 45 of bracket 38 opposite from inwardly turned portion 39 thereof is member 46 which is comprised of a generally rectangular flat block member having a pair of angularly disposed fluid delivery ports 47 at the free end 48 thereof which are internally connected to hose connection tube 49 disposed on one lateral edge face 50. The outer end 37 of flexible tube 14 is connected to member 49. Said block 46 is pivotally connected by any suitable means to bracket 38 such as the wire clamp member 51 as shown in FIGS. 2 and 5 which in cooperation with the rounded end surface 52 of block member 46 permits pivotal adjustment of block member 46 to any position relative to bracket 38 as desired.

One or more clips 53 are provided along intermediate lengths of flexible tubing 14 which have a generally S-shaped configuration to provide an upper U-shaped bend or trough 54 for receiving an intermediate portion 55 of flexible tubing 14 and a substantially straight extension 56 which is adapted for affixation to the windshield trim 57 as shown in FIG. 2 and which will be described in greater detail hereinbelow.

In operation the windshield cleaning apparatus of the present invention may be mounted in an automobile generally as shown in FIG. 1. The mounting lug 32 is affixed to the bottom edge portion 58 of the instrument panel 35 at some convenient location thereon and the flexible tube 14 is run to the exterior of the car for example between the front edge of the driver's door and the frame and along the outer bottom edge of the windshield to the central front portion thereof. Nozzle means 13 is affixed to the central bottom portion of the windshield by inserting the inwardly turned edges 39, 43 of the bracket 38 and clamping member 41 respectively between the windshield trim 57 and the windshield itself 59 as shown in FIG. 5. Mounting clips 53 are likewise positioned at spaced points between nozzle means 13 and the driver's side of the windshield (to the left as viewed in FIG. 1) by manually forcing their respective extensions 56 between the windshield trim 57 and the windshield 59 as shown in FIG. 6. Then the appropriate pivotal orientation of the block member 46 is selected to direct the windshield cleaning liquid from the angular ports 47 against the desired areas of the windshield (see FIG. 1).

By exerting manual pressure in a vertical direction on plunger member 25, controlled amounts of cleaning fluid will be delivered from reservoir 11, through flexible tube 14 and to nozzle means 13 from whence the liquid will be sprayed onto the windshield.

It is obvious that the device of this invention provides windshield cleaning apparatus which is of simple construction and hence manufactured at low cost. The mode of operation is extremely simple, causing minimal difficulties in operation. It may be quickly installed and is thus particularly useful during an emergency. It will provide automobiles of all models with an inexpensive, continually operable windshield apparatus which may be installed and removed quickly as needed.

It is to be understood that changes and additions can be made by those skilled in the art without departing from the spirit and scope of the invention.

I claim:

Automotive windshield cleaning apparatus comprising a liquid reservoir having an opening thereon, a cap member secured to said opening and having a hole therein, a first tube and pumping means disposed on said cap, said first tube extending through said hole of said cap into said reservoir and terminating adjacent the bottom thereof, first bracket means for holding said reservoir and adapted for releasable attachment to an automobile instrument panel, liquid delivery means adapted for discharging the cleaning liquid pumped from said reservoir against the automobile windshield including nozzle means comprising a generally rectangular bracket member having a downwardly turned portion at one end thereof and a spring biased clamping member pivotally mounted to said bracket member at an intermediate portion thereon and having a corresponding upwardly turned end portion thereon movable in opposed relation to said downwardly turned portion on said bracket member to provide attaching or clamping jaws biased toward one another and adapted for engagement with the metal trim on an automobile windshield and a generally rectangular flat block member having a pair of angularly disposed delivery ports mounted pivotally adjacent the free end of said bracket member and being angularly adjustable relative to the longitudinal axis of said bracket member, a second flexible tube connected at its inner end to the discharge end of said pumping means and at its outer end to said liquid delivery means, at least one clip means disposed at an intermediate portion of said second flexible tube having a tube-receiving trough portion adapted for supporting said tube and a substantially straight extension thereon adapted for insertion between said windshield trim and said windshield to hold said clip means in place.

References Cited by the Examiner

UNITED STATES PATENTS

| | | | |
|---|---|---|---|
| 1,112,202 | 9/14 | Estes | 222—180 X |
| 2,105,676 | 1/38 | Stow | 20—40.5 |
| 2,547,109 | 4/51 | Bacheller | 222—385 |
| 2,576,435 | 11/51 | Bachrach | 20—40.5 |
| 2,588,694 | 3/52 | Bracken | 296—95 |
| 2,729,506 | 1/56 | Ziherl et al. | 222—385 |
| 3,010,473 | 11/61 | McCurnin | 20—40.5 X |

FOREIGN PATENTS

| | | |
|---|---|---|
| 362,592 | 12/31 | Great Britain. |
| 466,200 | 10/51 | Italy. |

HARRISON R. MOSELEY, *Primary Examiner.*